Figure 1:
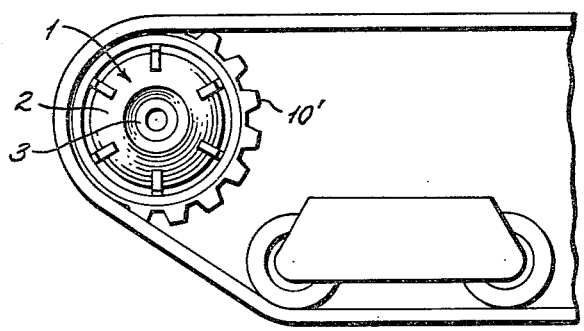

Dec. 18, 1962 G. F. M. EVEN 3,068,711
SPROCKET WHEEL
Filed Dec. 12, 1960 2 Sheets-Sheet 1

INVENTOR
Georges Francois Marie Even

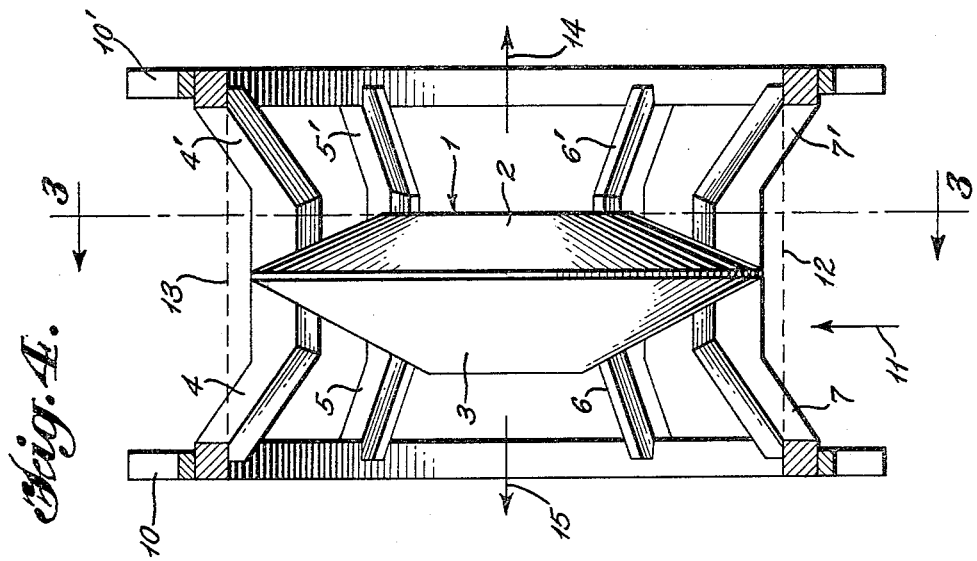
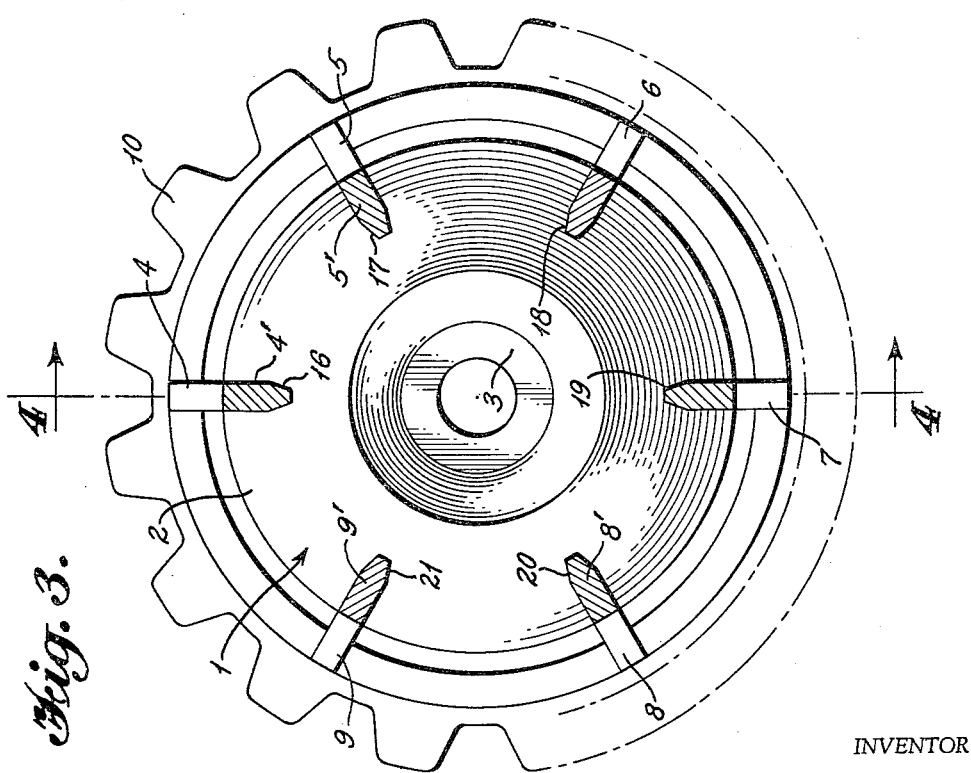

3,068,711
SPROCKET WHEEL
Georges Francois Marie Even, 7 Ave. Pierre Grenier, Boulogne, France
Filed Dec. 12, 1960, Ser. No. 75,157
Claims priority, application France Dec. 11, 1959
11 Claims. (Cl. 74—243)

This invention relates to the construction of sprocket wheels for track-laying vehicles, such as tractors, half-tracks, tanks, and the like, for looping the ends of an endless track about such sprocket wheels.

A type of mishap that rather commonly befalls track-laying vehicles as heretofore constructed, is that when moving over loose soil such as sand, thick mud, snow, and the like, cakes of the soil material are driven by the endless track into the sprocket wheels where they are further compacted and built up until they may ultimately force the track out of engagement with the sprocket teeth. Reengaging the endless track with the sprockets is at all times a tedious and difficult process and in the case of a military tank in action the stoppage may have fatal consequences.

In an effort to minimize such tendency to clogging, conventional sprocket wheels are usually constructed with apertures in the side flanges thereof to permit the soil material to be discharged therefrom. While such discharge apertures serve their purpose in the more usual types of terrain, they are unable to discharge their function properly when confronted with the loose, highly compactable, types of soil of the character mentioned above, with the consequences indicated.

The applicant has investigated the problem and has reached the conclusion that the clogging of the sprocket wheels can be obviated practically completely, provided certain features of design are incorporated in the construction of the sprocket wheel with the purpose of enabling the soil material to flow freely through the sprocket wheel and to be discharged therefrom before the material has been compacted therein too far to permit of such discharge. A first such feature is that a substantially free and unobstructed flowpath should be defined for the soil material radially inward into the wheel, then axially outward through the side openings therein. Another and equally important feature is that the hub structure of the sprocket wheel should be so shaped as to facilitate a continuous flow of the material over said flowpath including especially the change from the radially inward to the axially outward portions of said path, and positively to expel the material axially outward through the side apertures.

Attainment of the above-said features constitutes objects of this invention.

Broader objects lie in the provision of a sprocket wheel construction which will provide greatly improved operation in all types of terrain, while being strong, and simple to make and service, and substantially to eliminate any danger of clogging and de-treading of the track.

In an important aspect of the invention there is provided a sprocket wheel comprising a generally circular hub member of biconvex or lenticular profile, a pair of apertured annular sprocket members having an aperture diameter substantially as large as or larger than the outer diameter of the hub member and circumferentially spaced arms interconnecting said sprocket members with the hub to retain the sprocket member in parallel axially spaced relation to each other and in axially spaced relation with the convex sides of the hub, whereby a continuous and unimpeded flowpath of large section area is created for soil material deposited from the track on the hub for lateral discharge by the convex sides thereof.

Tests have shown that best results are attained when the wheel is so designed that the soil material does not undergo a degree of compacting as it flows through the wheel, greater than about 20%; hence, in a preferred form of the invention the components of the improved sprocket wheel are so shaped and dimensioned that the ratio of minimum to maximum flow section area of the flowpath defined between said components is not less than about 0.8:1.

Figure 2:
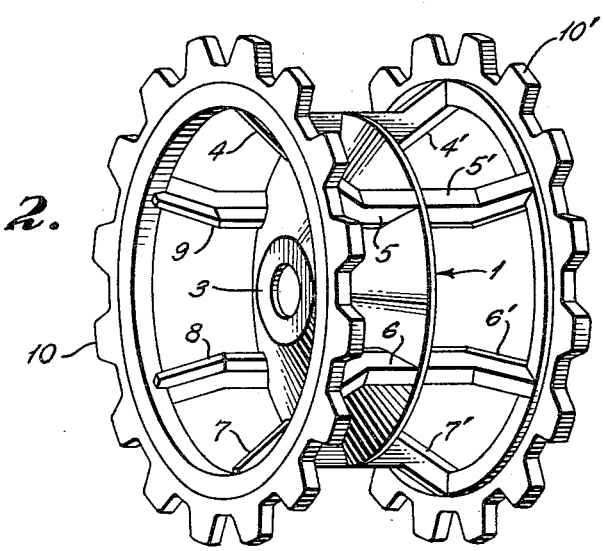
Figure 5:
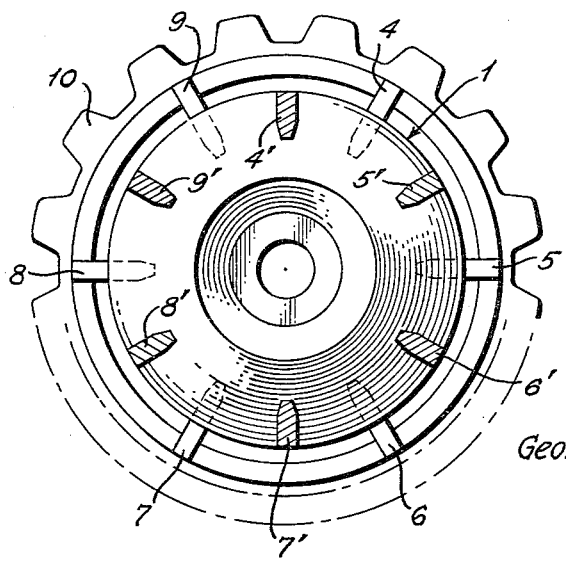

An exemplary embodiment of the invention will now be described for purposes of illustration but not of limitation with reference to the accompanying drawings, wherein:

FIG. 1 is a fragmentary small-scale side view of a tank vehicle including the improved sprocket wheel therein;

FIG. 2 is a perspective view of the sprocket wheel of the invention on a larger scale than in FIG. 1, FIG. 3 is a front view of the sprocket wheel of FIG. 2 on a further enlarged scale, partly in section on line 3—3 of FIG. 4; and FIG. 4 is a view corresponding to FIG. 3 at right angles thereto, partly in section on line 4—4 of that figure; and FIG. 5 is a view similar to FIG. 3 wherein each arm on one side of the hub member is circumferentially displaced from a related arm on the other side of the hub member.

Referring to the drawings, a sprocket wheel according to the invention includes a generally biconical hub member 1 (see especially FIG. 4) in the form of two cone frusta 2 and 3 having their larger base in common. As shown, one of the two frustoconical sections, as shown the section 2, is shallower than the other section 3, having the same taper angle as, but a larger small base than said other section. Secured e.g. welded to the periphery of the hub member and projecting in opposite directions therefrom generally axially, are two sets of spider arms or spokes: a first set of arms 4, 5, 6, 7, 8 and 9 project on the side comprising the cone frustum 3, and another set of arms 4', 5', 6', and 7' project on the side comprising cone frustum 2. The arms in each set are angularly equispaced about the periphery of the hub and, in the construction shown, each arm of one set is aligned with a corresponding arm of the other set. A pair of sprocket annuli 10 and 10' are secured, e.g. welded, to the outer or free ends of the respective sets of arms such as 4 and 4', and are retained in parallel spaced relation thereby with the sprocket teeth in registering relation as between the two annuli. As shown, the arms such as 4' are substantially equal in length to the arms such as 4, whereby the axial spacing from the hub member to annulus 10' is somewhat greater than the spacing from the hub to annulus 10 owing to the asymmetrical shape of the hub member noted above. The spokes such as 4 and 4', in the embodiment shown, are of angular form in longitudinal contour, having an inner portion extending the axial direction and an outer portion diverging away from the axis as clearly shown for the uppermost and lowermost spokes or arms in FIG. 4. In cross section by a plane normal to the axis each spoke or arm is preferably formed with a double bevel such as 16—21 at the edge thereof directed towards the axis of the sprocket (see FIG. 3).

It will further be noted that due to the angular diverging shape of the arms such as 4, 4', a major portion of the arms is positioned radially inwardly of the central aperture of each of the sprocket annuli 10 and 10'. Such central aperture of the sprocket annuli is larger in diameter than the largest diameter of the hub, as indicated by the dotted lines 12—13 (FIG. 4).

In operation, should loose soil or other materials be introduced into the sprocket wheel by the action of the track, as indicated by the radially inwardly directed arrow 11, such material is initially exposed to a low degree of compression between the flanges of the sprocket annuli 10 and 10', such compression continuing until the material has reached a position corresponding to the inner circumference of the apertures in annuli 10 and 10', as indicated by the dotted lines 12 and 13 in FIG. 4. As the material is pushed in the radial inward direction past said inner circumference of annuli 10 and 10' as indicated by lines 12, 13, the inwardly converging channels defined between adjacent arms or spokes act to compress the material slightly in a direction normal to that of its initial compression, while at the same time the conical surfaces of the frustoconical hub sections act to discharge the material, thus moderately compressed in two perpendicular directions, outwardly of the sprocket wheel through the wide apertures of the sprocket flange annuli 10 and 10', as indicated by the outward axial arrows 14 and 15 in FIG. 4. Tests performed with the sprocket wheel described under diverse conditions have shown that no clogging or fouling of the wheel occurs when the degree of compression of the material through the wheel does not exceed a value as high as about 20%.

It will be understood that various changes may be made in the details of the single structural embodiment described and illustrated without exceeding the scope of the invention. Thus the hub 1 may be symmetrical to either side of the central plane of symmetry of the wheel rather than asymmetrical as here shown. The hub, instead of being formed by two cone frusta, may be formed from two sections of some other shape, e.g. rounded in axial contour, to provide a similar biconvex or lenticular member capable of exerting the desired axial outward force on the material to discharge it out of the wheel through the sprocket annulus apertures. The arms or spokes interconnecting the sprocket annuli with the hub may differ in shape from that shown; thus they may be straight, or arcuate, and they may be contoured in cross section in any suitable way for facilitating the flow of material past them. Also, instead of said arms being aligned as between the two oppositely projecting sets, the arms of the respective sets may be displaced with respect to one another around the circumference of the wheel.

In the form of embodiment shown, the wheel is asymmetrically designed to ensure a higher rate of discharge of material through annulus 10' than through annulus 10, which latter is arranged to be positioned inboard of the vehicle. In cases where the vehicle construction is such that there is substantially no or very little clearance between the sprocket wheel and vehicle frame for the discharge of material, the invention contemplates a fully asymmetrical construction in which the hub member 1 would comprise only a single frustoconical (or similar convex) section with a single set of arms or spokes projecting therefrom in only the outboard axial direction to support the outboard sprocket annulus 10', while the inboard sprocket annulus 10 may in such modification be supported directly around the larger base of the hub, i.e. in the plane indicated by the vertical midline shown in chain lines in FIG. 4.

Whatever the particular construction used, it will be understood that in the operation of a sprocket wheel according to the invention, there is created a substantially free, continuous and unobstructed flowpath of large sectional area for the soil material discharged by the endless track radially inwardly into the wheel. This flowpath is of greatly increased cross sectional area than that available in a conventional sprocket wheel of similar sprocket diameter, since in the first place substantially the full space between the two sprocket annuli 10 and 10' (see FIG. 4) is available for the inflow of the material. Moreover, the flow section at any point of the flowpath is nearly constant, the maximum variation as between minimum and maximum flow sections areas preferably being not greater than in the ratio of 0.8:1. Hence the material is only compacted to a very moderate degree as it flows through the wheel, in addition, owing to the convex shape of the hub member according to the invention the material is smoothly and uniformly turned from the radially inward to the axially outward portion of its flowpath to be discharged through the side opening in the sprocket member. In this manner the loose material, such as sand, snow, earth and mud, instead of being retained within the sprocket wheel there to be compacted more and more until it ultimately forces the track off the sprocket teeth, as was the case heretofore, is continually discharged through the wide and unobstructed flowpath defined in the sprocket wheel of the invention.

What is claimed is:

1. A sprocket wheel for entraining an endless track, comprising a generally circular hub member of biconvex profile, a pair of apertured sprocket members having an aperture diameter substantially at least as large as the outer diameter of the hub member, and circumferentially spaced arms interconnecting said sprocket members with the hub to retain the sprocket members in parallel axially spaced relation to each other and in axially spaced relation with the convex sides of the hub, whereby a continuous flowpath of large section area is created for soil material which may be pushed by said track radially inward into the wheel, said material being discharged axially outward by the convex sides of the hub.

2. A sprocket wheel assembly for an endless band comprising a generally lenticular hub member, annular sprocket members, having a larger outside diameter than the hub's largest diameter, a plurality of sprocket teeth on each sprocket member, circumferentially spaced arms converging downwardly and inwardly from the sprocket members and interconnecting the sprocket members with opposite sides of the hub to retain the sprocket members and hub in parallel relation with the hub positioned between the sprocket members with each outer face spaced axially inwardly from the adjacent sprocket member, the opening in each sprocket member having substantially the same diameter as the maximum diameter of the hub member.

3. A sprocket wheel for an endless band comprising a hub member having a convex side, a first annular sprocket member secured around the periphery of the hub member, a second annular sprocket member, circumferentially spaced arms interconnecting said hub member with said second sprocket member to retain said second sprocket member in parallel spaced relation to the first sprocket member and to the convex side of the hub, said second sprocket member being formed with an aperture at least substantially as large in diameter as the outer diameter of said hub.

4. A sprocket wheel for an endless band as claimed in claim 1, wherein said members and arms are so dimensioned that the ratio of minimum to maximum flow section area through said flowpath is not substantially less than about 0.8:1.

5. A sprocket wheel for an endless band comprising a biconvex hub member in the general form of two cone frusta having a common larger base, a pair of apertured sprocket members, circumferentially spaced arms interconnecting said sprocket members with opposite sides of the hub to retain the sprocket members in parallel axially spaced relation to each other and in axially spaced relation with the convex sides of the hub, whereby substantially the whole axial space between said sprocket members is available for the radially-inward flow of soil material as driven into the wheel by said endless band and thence to be forced out by said frustoconical hub sides out through the apertures in the respective sprocket members.

6. A sprocket wheel as claimed in claim 5, wherein each of said arms has its axially inner end secured to said hub member near the outer periphery thereof and its axially outer end secured to a sprocket member near the inner periphery thereof.

7. A sprocket wheel as claimed in claim 5, wherein said arms diverge radially outwards in the axial direction away from the hub member.

8. A sprocket wheel as claimed in claim 5, wherein said members are so dimensioned that the flow section area of said path is larger on one of the convex sides of the biconvex hub member than on the other side thereof.

9. A sprocket wheel as claimed in claim 5, wherein the cone frustum on one side of the hub member is shallower than the cone frustum on the other side.

10. A sprocket wheel as claimed in claim 1, wherein each arm on one side of the hub member is aligned with an arm on the other side of the hub member.

11. A sprocket wheel as claimed in claim 1, wherein each arm on one side of the hub member is circumferentially displaced from a related arm on the other side of the hub member.

References Cited in the file of this patent

UNITED STATES PATENTS

| | | |
|---|---|---|
| 2,128,425 | Martelli | Aug. 30, 1938 |
| 2,157,301 | Neuman | May 9, 1939 |
| 2,592,541 | Curtis | Apr. 15, 1952 |
| 2,599,233 | Christie | June 3, 1952 |